United States Patent [19]

Raman et al.

[11] Patent Number: 5,400,394
[45] Date of Patent: Mar. 21, 1995

[54] ADAPTIVE ECHO CANCELLER FOR VOICE MESSAGING SYSTEM

[75] Inventors: Vijay R. Raman, Santa Barbara; Mark R. Cromack, Santa Ynez, both of Calif.

[73] Assignee: Digital Sound Corporation, Carpenteria, Calif.

[21] Appl. No.: 265,697

[22] Filed: Jun. 23, 1994

Related U.S. Application Data

[63] Continuation of Ser. No. 752,825, Aug. 30, 1991, abandoned.

[51] Int. Cl.6 .......................... H04J 15/00; H04M 1/74
[52] U.S. Cl. ...................................... 379/88; 370/32.1; 379/410
[58] Field of Search .................... 379/411, 410, 67, 88; 370/32.1, 32

[56] References Cited

U.S. PATENT DOCUMENTS

| | | | |
|---|---|---|---|
| 3,499,999 | 3/1970 | Sondhi | 379/410 |
| 3,500,000 | 3/1970 | Kelly, Jr. et al. | 379/410 |
| 3,828,147 | 8/1974 | Ochiai et al. | 379/410 |
| 4,057,696 | 11/1977 | Gitlin et al. | 379/411 |
| 4,425,483 | 1/1984 | Lee et al. | 379/411 |
| 4,479,036 | 10/1984 | Yamamoto et al. | 379/410 |
| 4,554,417 | 11/1985 | Boyer | 370/32.1 |
| 4,582,963 | 4/1986 | Danstrom | 379/411 |
| 4,621,172 | 11/1986 | Kanemasa et al. | 370/32.1 |
| 4,636,586 | 1/1987 | Schiff | 379/390 |
| 4,712,235 | 12/1987 | Jones, Jr. | 379/410 |
| 4,757,527 | 7/1988 | Beniston et al. | 379/410 |
| 4,805,215 | 1/1989 | Miller | 379/411 |
| 4,868,874 | 9/1989 | Takatori et al. | 379/411 |
| 4,914,692 | 4/1990 | Hartwell et al. | 379/410 |
| 4,935,919 | 6/1990 | Hiraguchi | 370/32.1 |
| 4,947,425 | 8/1990 | Grizmala et al. | 379/410 |
| 4,970,715 | 11/1990 | McMahan | 370/32.1 |
| 4,984,265 | 1/1991 | Connan et al. | 379/390 |
| 5,007,007 | 4/1991 | van Zanten et al. | 364/574 |
| 5,029,167 | 7/1991 | Arnon et al. | 370/32.1 |
| 5,125,024 | 6/1992 | Gokcen et al. | 379/88 |

OTHER PUBLICATIONS

Gitlin, et al., "On the Design of Gradient Algorithms for Digitally Implemented Adaptive Filters," IEEE Transactions on Circuit Theory, vol. CT-20, No. 2, Mar. 1973, pp. 125–136.

Duttweiler, et al., "A Single-Chip VLSI Echo Canceler," The Bell System Technical Journal, vol. 59, No. 2, Feb. 1980, pp. 149–161.

(List continued on next page.)

Primary Examiner—Thomas W. Brown
Attorney, Agent, or Firm—Christie, Parker & Hale

[57] ABSTRACT

An apparatus and method for echo cancellation in voice-messaging and voice-response systems, to enhance recognition of received DTMF and voice signals, comprising an efficient software echo canceller using adaptive digital filtering techniques. The voice messaging system includes analog telephone line interface modules which provide digitized voice data to a digital signal processor (DSP) chip. A transmit data line and a receive data line are each coupled to a cancel module with a cancel filter and an adapt/window module with an adaptive digital filter. The cancel filter causes echo cancellation on the receive data line; the adapt/window module monitors buffered transmit data in non-real time, without directly causing cancellation to occur, and selectively transfers an adjacent window of filter coefficients to the cancel filter under control of an adaptation control coupled to the adapt/window module. The control identifies a plurality of frames meeting a power criterion and passes the frames to the adaptive filter, which adapts on taps in frame segments during all available DSP real time, using a "cycle steal" approach for testing whether additional DSP processor cycles are available to use for echo cancellation. A masked white noise burst may be used to initialize adaptation. A windowing function identifies the best taps of an adapted frame, and corresponding coefficients are copied or loaded into the cancel filter. All control parameters are configurable, enabling site-specific performance optimization.

15 Claims, 5 Drawing Sheets

U.S. PATENT DOCUMENTS

Mueller, "Combining Echo Cancellation and Decision Feedback Equalization," The Bell System Technical Journal, vol. 58, No. 2, Feb. 1979, (10 pages).

Sondhi, et al., "Silencing Echoes on the Telephone Network," Proceedings of the IEEE, vol. 68, No. 8, Aug. 1980, pp. 948–963.

Cioffi, "A Fast Echo Canceller Initialization Method for the CCITT V.32 Modem," IEEE Transactions on Communications, vol. 38, No. 5, May 1990, pp. 629–638.

Murano et al., "Echo Cancellation and Applications," IEEE Communications Magazine, Jan. 1990, pp. 49–55.

Benesty, et al., "A fast Exact Least Mean Square Adaptive Algorithm," IEEE, Publication No. CH2847-2/90/0000-1457, 1990, pp. 1457–1460.

Roulier, et al., "An Echo Cancellation Algorithm for Operation With a Digital Speech Coder in a Single Signal Processor," IEEE, Publication No. CH2561-9/88/0000-1628, 1988, pp. 1628–1631.

Proakis, "Echo Cancellation in Data Transmission over Telephone Channels," Digital Communications (Second Edition), McGraw-Hill, 1989, pp. 683–691.

Messerschmitt, et al., "Digital Voice Echo Canceller with a TMS32020," Digital Signal Processing Applications with the TMS320 Family, vol. 1, Texas Instruments, 1989, pp. 415–454.

Bogert et al., "The Quefrency Alanysis of Time Series for Echoes: Cepstrum, Pseudo-Autocovariance, Cross-Cepstrum and Saphe Cracking" *Proceedings of the Symposium on Time Series Analysis,* Rosenblatt, Murray, Editor, Brown University 1962, pp. 209–243.

Kuo, Sen, "An Implementation of Adaptive Filters with the TMS320C25 or the TMS320C30" *Digital Signal Processing Applications with the TMS320 Family, Theory, Algorithms, and Implementation,* vol. 3, Papamichals, Panos, Editor, Texas Instruments, 1990, pp. 191–243.

Widrow, et al., "Adaptive Signal Processing", *Adaptive Signal Processing,* Larson Publications, 1985, pp. 338–346.

ADAPTIVE ECHO CANCELLER FOR VOICE MESSAGING SYSTEM

CROSS-REFERENCE TO RELATED APPLICATION

This is a continuation of application Ser. No. 07/752,825, filed Aug. 20, 1991, now abandoned.

FIELD OF THE INVENTION

This invention generally relates to apparatus and methods for reduction and cancellation of voice-band echo in voice-messaging or voice-response systems which are connected to the telephone network. The invention specifically relates to adaptive filter driven echo cancellers having adaptive control means for loading windowed filter coefficients to a cancel filter under configurable conditions.

PROPRIETARY RIGHTS NOTICE

This document contains certain copyrighted program listings proprietary to the assignee hereof. The assignee has no objection to reproduction or copying by the public of the document as it appears in the files or records of the U.S. Patent & Trademark Office, but reserves all other rights in the copyrighted listings.

BACKGROUND OF THE INVENTION

In voice-messaging or voice-response systems connected to the public switched telephone network, outbound (transmit) and inbound (receive) signals are present. As shown in FIG. 2B, a conventional telephone 90 has a single channel 92 for both transmit and receive signals which is a 2-wire connection. This 2-wire channel is coupled to a telephone company office ("CO") switch 93, which converts the 2-wire single channel to separate transmit and receive channels on a 4-wire channel 94. The 4-wire channel is connected, possibly over a long distance, to a remote CO switch 95 where it is converted into a second or remote 2-wire channel 96. The remote channel is routed to a remote device, such as a private branch exchange (PBX) 97 at a private office. The PBX can be coupled to a voice messaging system 1 which may contain yet another four-to-two conversion device with output on an internal channel 99.

Four-to-two wire conversion devices are called "hybrids" and cause signal transformations which are always imperfect due to line impedance mismatches. As shown in FIG. 2C, a hybrid 2 in a voice messaging system 1 may have an internal reference impedance $Z_R$ different from a load impedance $Z_L$ of the PBX 97. Thus, energy from the transmit data can and usually will couple into the receive data along an "echo path" denoted by arrow 5. Echo impairs the accurate detection and recognition of incoming tone and speech signals that are typically used to signal the voice messaging system to control the flow of transmit data (for example, to control the playback of speech). A similar impedance mismatch may exist in other hybrids in the CO switches 93, 95 of FIG. 2B. Since a telephone call may be routed through a plurality of hybrids along a path from caller to receiver, echo can originate at several different points along the telephone connection. The goal of echo-cancellation is to replace the "echo-corrupted" received data with "echo-cancelled" received data, in which the echo is effectively subtracted out of the received data.

As shown in FIG. 2C, the voice messaging system 1 further includes a coder-decoder (CODEC) 4 with a digital-to-analog converter 6A and an analog-to-digital converter 6B. Digital data is routed on a receive data line 202 and a transmit data line 204. The data received by the voice messaging system is corrupted by echo whenever transmit data is non-zero. In particular, in a phone call, if the source of the echo is either very close to the voice messaging system ("near end echo"), or the source of the DTMF signals or speech is distant, the echo problem is worsened. Echo cancellation or reduction in this context comprises techniques to reduce the echo level to enhance signal detection performance.

In the prior art relating to echo cancellation and reduction in voice-messaging and voice-response systems, the use of analog circuitry to compensate for impedance mismatch is well known, as exemplified by U.S. Pat. Nos. 3,499,999 and 3,500,000. Analog circuitry is "tuned" by adjusting hardware component values to reduce the level of echo. Analog apparatus has numerous disadvantages: the extent of "tuning" possible is limited; the guidelines for tuning are not clear; it is not adaptable on a call-by-call basis, etc.

Accordingly, those skilled in the art desire to have a digital echo canceller in a voice messaging or voice response system.

Software implementation of adaptive digital filtering techniques for voice-band echo-cancellation techniques in telecommunications and other areas is well known, as exemplified by: (1) K. Murano et al, "Echo Cancellation and Applications, " IEEE Communications Magazine, Jan. 1990, p. 49; (2) D Messerschmitt et al, "Digital Voice Echo Canceller with a TMS32020," Digital Signal Processing Applications with the TMS320 Family, Vol. 1, Texas Instruments, 1986; (3) M. Sondhi et al., "Silencing Echoes on the Telephone Network," Proceedings of the IEEE, Vol. 68, No. 8, pp. 948–963, August 1980.

Much prior art is concerned with application of echo-cancellation to reduce far-end audible echo during a telephone conversation, as disclosed in Sondhi et al., Messerschmitt et al , and D Duttweiler et al, "A Single Chip VLSI Echo Canceller, " 59 Bell System Tech J. 149, February 1980. Use of echo-cancellation in data modems to cancel near-end and far-end echoes is also known, as disclosed in J Cioffi, "A Fast Echo Canceller Initialization Method for the CCITT V.32 Modem," IEEE Trans. on Comm. 629, May 1990, and parts of J. Proakis, "Digital Communications, " 2d ed McGraw-Hill, 1989.

The high computational needs of all prior echo canceller implementations are a significant hindrance to use of these techniques when computation budgets are tight, as in a voice messaging system with echo cancellation implemented in software for a digital signal processor (DSP) IC. Thus, those of skill in the art would appreciate an efficient implementation to allow other voice-band activity of significant computational cost to run concurrently with the echo-canceller on the DSP.

In the prior art, software echo-canceller parameters (e.g. number of coefficients, various threshold parameters) are not completely configurable, i.e., the parameters cannot all be changed to other values while the messaging system is operational. This is a disadvantage since configurability can be used to "tune" the parameters to the desired level of performance for the available processing power and to match characteristics of the location or site of the system.

Adaptive echo cancellers are also known, as best exemplified by U.S. Pat. No. 4,757,527 (Beniston et al.). Beniston et al. discloses two separate adaptive and programmable filters of identical size and structure, wherein error data from the adaptive filter is compared to error from the programmable filter, and coefficients are transferred when performance of the adaptive filter is better. Beniston et al. is primarily directed at echo cancellation during doubletalk, during which transfer is inhibited.

The adaptation process in prior art echo-cancellers under discussion requires time for convergence, before the echo canceller reduces echo to the desired level. This time may be kept to a minimum at a fairly high computational effort, but the adaptation time is never zero (instantaneous). The use of "training" signals in echo cancellers and adaptive equalizers prior to actual transmission of data addresses this problem, but its use has been limited to modem applications and other phone connections not involving human speech.

Thus, those skilled in the art desire an echo canceller with the capability to use training signals for enhancing the adaptation process, while using other signals to "mask" the audible effect of the training signal.

Those skilled in the art desire an efficient echo-canceller implemented in software in a voice messaging or voice-response system, using adaptive digital filtering techniques, in which an adjacent window of coefficients is chosen to apply echo cancellation to the best form of a sampled waveform.

Those skilled in the art would also desire a software adaptive echo canceller using techniques to minimize computational needs of the echo canceller. Specifically, use of "traffic-engineering" techniques such as processor "cycle steal" is desirable.

Those skilled in the art would also appreciate an adaptive digital software echo canceller which can be implemented on a general-purpose digital signal processor (DSP) which serves multiple channels of voice-band activity while using a maximum number of processor cycles for echo cancellation.

SUMMARY OF INVENTION

Accordingly, the present invention provides an apparatus and method for a digital software adaptive echo canceller in voice-messaging and voice-response systems, and specifically to implement echo cancellation to enhance recognition of received DTMF and voice signals, comprising a software efficient echo-canceller using adaptive digital filtering techniques. The voice messaging system includes analog telephone line interface modules which provide digitized voice data to a digital signal processor (DSP) chip. A transmit data line and a receive data line are each coupled to a cancel module with a cancel filter and an adapt/window module with an adaptive digital filter. The cancel filter implements echo cancellation on the receive data line using transmit and receive data; the adapt/window module monitors buffered receive and transmit data in non-real time, without directly causing cancellation to occur, and selectively transfers an adjacent window of filter coefficients to the cancel filter under control of an adaptation control coupled to the adapt/window module. The control identifies a plurality of transmit data frames meeting a power criterion and passes the frames to the adaptive filter, which adapts the adapt filter coefficients on taps in frame segments during all available DSP real time, using "cycle steal" means for testing whether additional DSP processor cycles are available to use for echo cancellation. A masked white noise burst can be used to accomplish pre-adaptation at startup time. A windowing function identifies the best subset of adapt filter coefficients, which are copied or loaded into the cancel filter. All control parameters are configurable, enabling site-specific performance optimization. The invention can be further understood with reference to the attached drawings.

DETAILED DESCRIPTION OF PREFERRED EMBODIMENTS

In the following detailed description of the preferred embodiments, specific terminology is used for the sake of clarity. However, the invention is not limited to the specific terms used, but includes all technical equivalents functioning in a substantially similar manner to accomplish a substantially similar result.

A. System Overview

Figure 1:
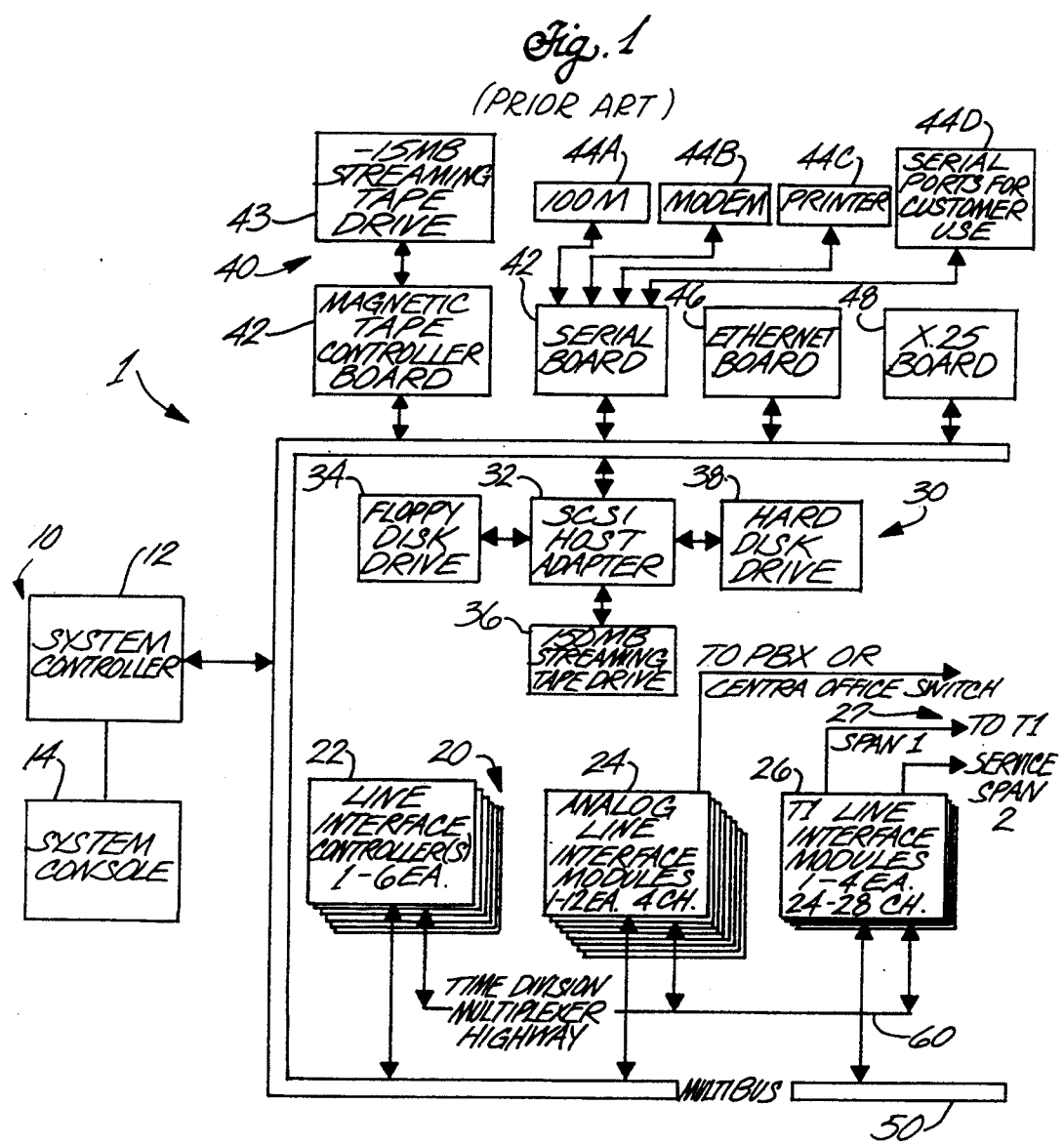
FIG. 1 is a block diagram of a voice messaging system.

Attention is first invited to FIG. 1, which shows a voice messaging system 1 in which the echo-canceller of the invention can be used. The system comprises control elements 10, telephone line interface elements 20, and peripheral interface elements 30, 40. These elements can exchange data and control signals on a bus 50 which can follow the Multibus protocol developed by Intel. An independent bus 60, called the time division multiplexer (TDM) highway, enables fast transfer of digitized voice band data. The system may be the VoiceServer 2110 product commercially available from Digital Sound Corp., 6307 Carpinteria Avenue, Carpinteria, Calif. 93013.

The control elements include a system controller 12, which can be an Intel 386-class CPU with conventional support electronics, coupled to the Multibus and to a system console 14, also of conventional type.

The telephone interface elements include one or more analog line interface modules 24, which receive incoming calls on a public switched telephone line 70. The telephone line 70 could be channel 98 of FIG. 2B. As is known in the art, the analog interface modules digitize incoming call signals and assign the call to a channel in the system. If T1 line service is available then one or more T1 line interface modules 26 of conventional design can couple T1 lines to the digital elements of the system.

Digital signal processing of voice messages and control signals is done by one or more line interface controllers (LICs) 22. Each LIC preferably includes a complete conventional Intel 386-class microcomputer coupled to a digital signal processor (DSP), such as one of the TMS320 family (e.g. the TMS32020) available from Texas Instruments. The DSP is coupled to a conventional memory store (not shown) such as at least several kilobytes of conventional electronic random access memory (RAM). The DSP preferably serves multiple channels of voice-band activity. The echo canceller of the invention is preferably implemented in assembly code software on the DSP, as discussed in detail below.

Depending on the needs of the system user, a plurality of peripheral devices can be interfaced to the system. For example, a SCSI host adapter 32 can be coupled to the Multibus and a streaming tape drive 36, a floppy disk drive 34, and one or more mass storage devices such as hard disk drives 38 can also be connected in known manner. The hard disk drives provide primary storage for voice data and can also provide storage for system software; via the Multibus, the disk drives are indirectly coupled to the DSPs on the LICs. Further, a magnetic tape controller board 42 can be provided to interface the Multibus to a streaming tape drive 43. A serial board 44 can connect to a plurality of serial devices such as IODM 44A, modem 44B, printer 44C, and user ports 44D. Additional communications can be provided using Ethernet board 46 and an X.25 board 48. Electronic and interface details of the elements designated 30 to 48 are conventional and well known.

B. DSP Operation

A DSP on a LIC communicates with voice signals from the "outside world" as follows. For each channel of voice band activity, at intervals equal to a predetermined sampling period, the DSP receives a sample value (receive data), and transmits a sample value (transmit data). Data reception and transmission occurs on the TDM highway. Data samples are obtained by the analog interface modules which sample analog data at 8 Khz, the standard voice-band sampling frequency used in the telephone network. The DSP accumulates, over a fixed period, a fixed number of receive digital data points to form a receive "frame" stored in a discrete area in the memory. Outgoing transmit data points are likewise accumulated to form a transmit frame. This period is called the frame duration and preferably is 22.5 milliseconds.

Over a frame duration, the DSP processes the received frames and transmit frames, for each channel of activity, as directed by DSP software. Voice-band processing may include diverse functions such as speech encoding and decoding, companding, tone detection and generation, speech recognition, text-to-speech conversion, etc. Many require DSP processing or computation. Thus, the frame duration determines the maximum total number of computations possible per frame of transmit and receive data.

C. Adaptive Digital Filter Echo Cancellation

Figure 2A:
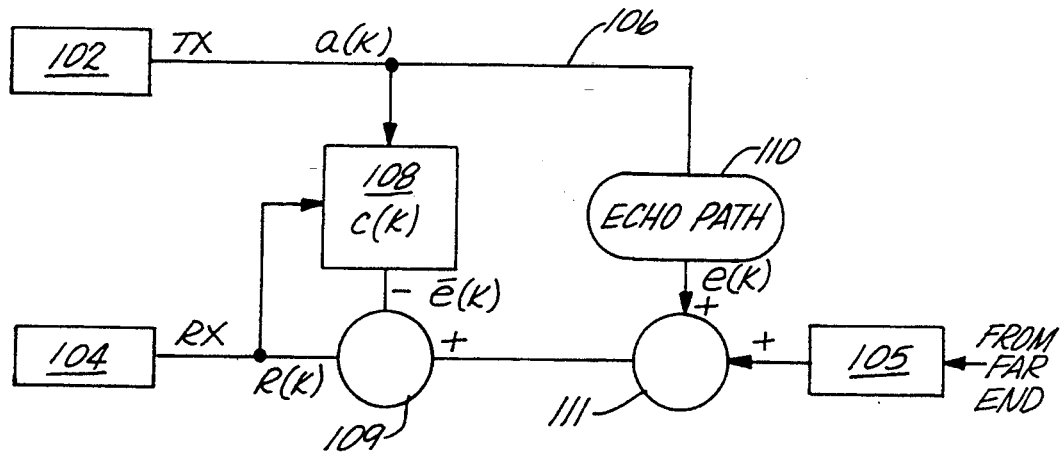
FIG. 2A is a block diagram of a prior art adaptive echo canceller.
Figure 2B:
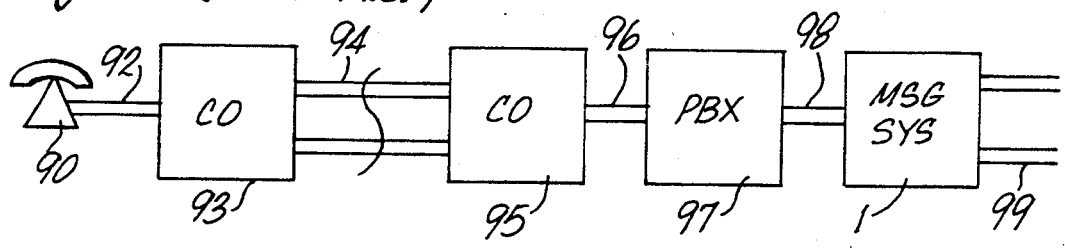
FIG. 2B is a block diagram of a telephony system.
Figure 2C:
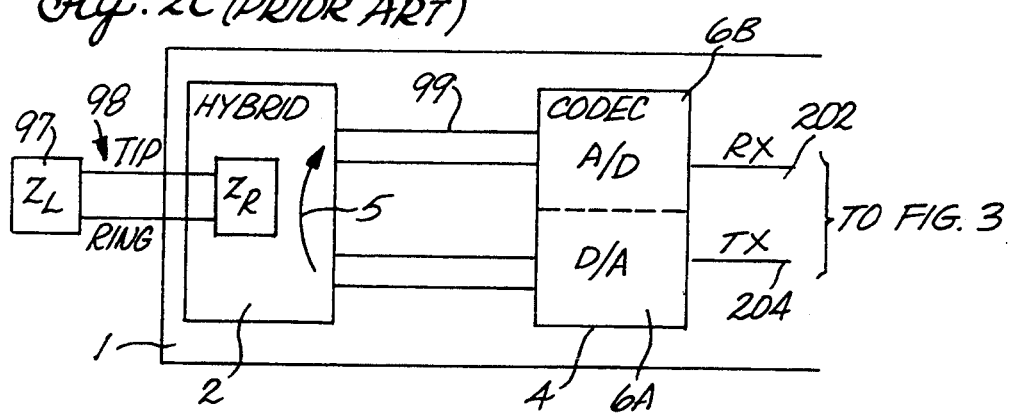
FIG. 2C is a block diagram of a hybrid in a voice messaging system.

Use of adaptive filters in echo cancellation is well known. A typical adaptive digital filter echo canceller is shown in FIG. 2A. Data is transmitted from a far end source 105 and coupled to a receiver 104 in the voice messaging system. Meanwhile, transmit data a(k) from transmit source 102 is generated elsewhere in the voice messaging system. An echo path 110 arises when the transmit data cross-couples into the far end source data; the additive effect of the echo is illustrated with accumulator 111. An adaptive digital filter 108 is placed parallel to the echo path to sense and cancel the echo on the echo path, by providing inverse cancelling data to an adder 109. The filter cancels echo by changing the value of individual bits in the data stream according to a set of variable coefficients in the filter. Changing the coefficient values causes a corresponding change in the filter characteristics. Normally three basic operations take place in an adaptive filter used for echo-cancellation:

1. Generation of an echo estimate: A filter takes as input the "transmit" data and outputs "echo estimate" data.
2. Generation of residual: Residual data (also called error data) is done by subtracting the echo-estimate from the "receive" data. The residual replaces the receive data (since it represents echo-cancelled receive data).
3. Update (adaptation) of the filter coefficients: this is based on an adaptation algorithm that updates the filter coefficients, and takes as input the transmit and residual data.

The filter type and adaptation (update) algorithm govern performance and computational requirements of this technique. The adaptive filtering system of FIG. 2A is computationally wasteful.

D. Configurable Adaptive Digital Filter Echo Canceller

The invention is implemented using a form of adaptive digital signal filtering, implemented in a computer program for the DSP written in the C source language. Preferably the C code is tested, debugged, and then hand-assembled into DSP assembler code, which is assembled and linked by a DSP assembler program commercially available from Texas Instruments. The assembled object code is loaded to the DSP in conventional manner.

Figure 3:
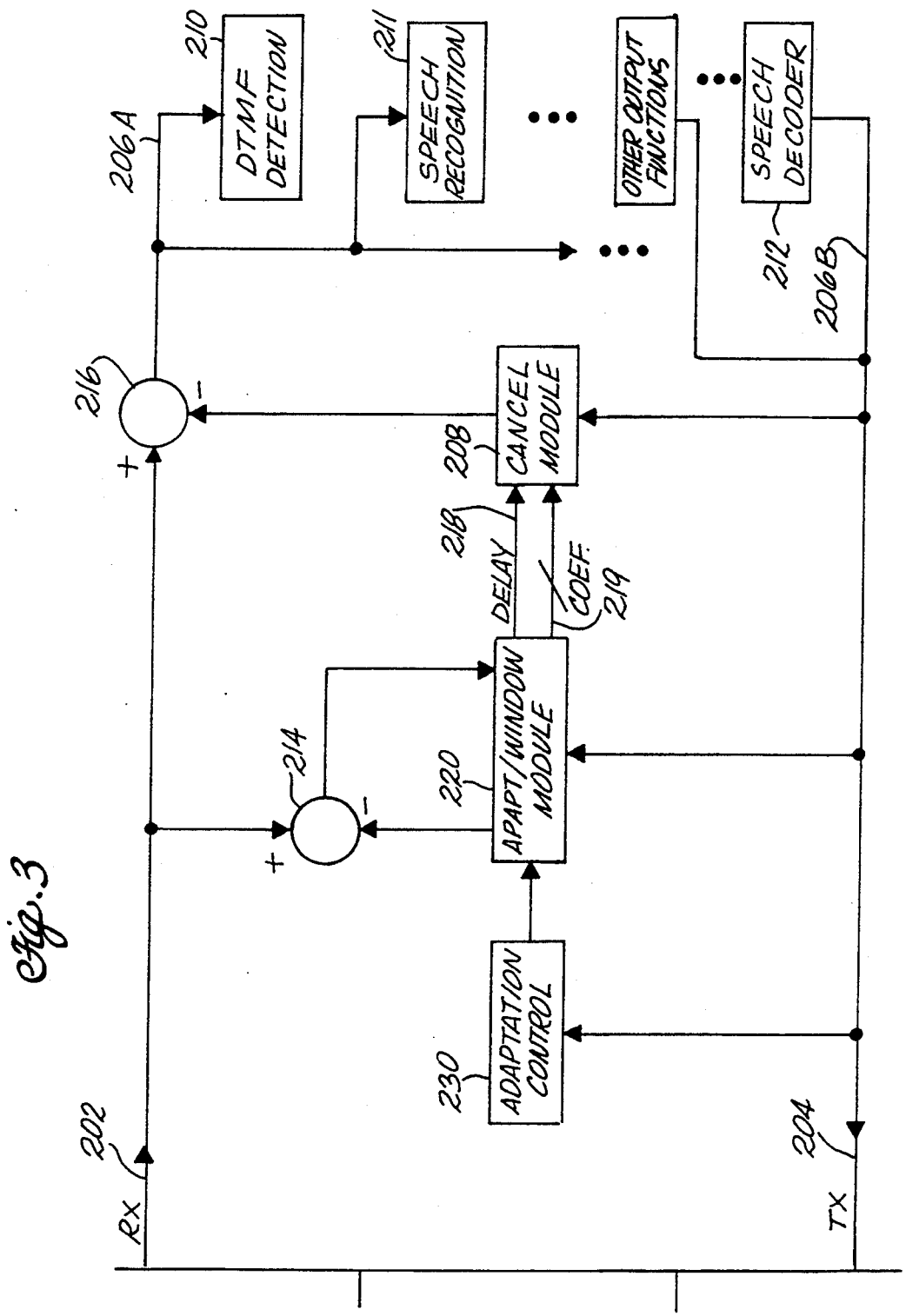
FIG. 3 is a block diagram of an echo canceller apparatus of the present invention.
Figure 4:
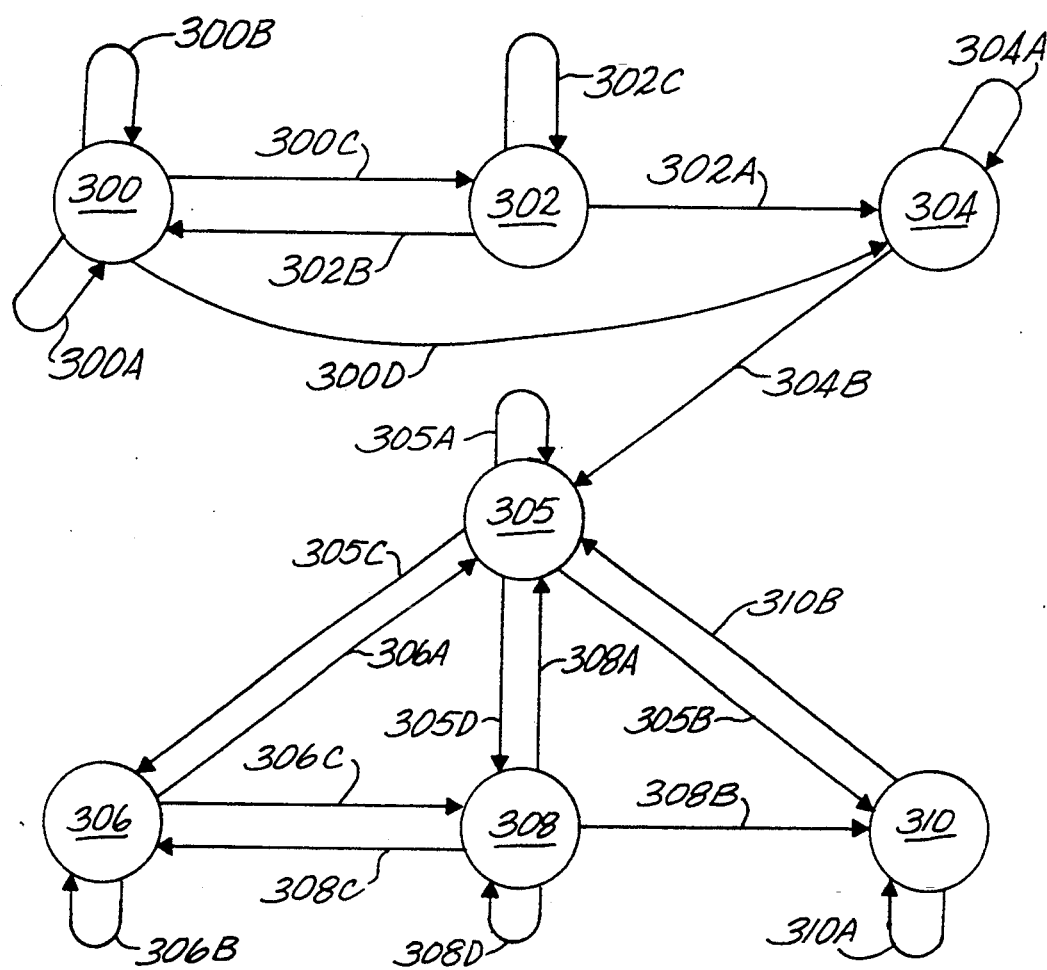
FIG. 4 is a state diagram of a control logic aspect of the present invention.

Structural arrangement of the echo canceller of the invention is shown in FIG. 3. The functional behavior of the echo-canceller of the invention is shown in FIG. 4, which illustrates logical states of operation of the apparatus of FIG. 3 and the method of the invention. Specific structure and features of the canceller are discussed below, followed by an operational discussion of FIG. 4. Details of the invention, including the best mode of implementation of data structures and configurable constants, are evident in the C programming language source code module attached as Appendix A. The modules in the listing include DT Module Parameters which define configurable parameters of the echo canceller, and code which defines data structures used in the echo canceller. The invention can be implemented in a C language echo cancellation software module named EC and contains several subroutines and function calls. State transitions in the EC module occur upon the conditions shown in Table 1, which correlate to the state transition arrows of FIG. 4.

TABLE 1

| Arrow | State Transition Conditions (!=NOT; *=OR) Condition (transition if true) |
|---|---|
| 300A | !pset*cycle*(mode!=null) (mode==null)*!hInit |
| 300B | (model=null)*!pset*!cycle |
| 300C | (mode!=null)*pset |
| 300D | (mode==null)*hInit |
| 302A | conv |
| 302B | !conv*!pset |
| 302C | !conv*pset |
| 304A | cycle |
| 304B | !cycle |
| 305A | !cycle |

TABLE 1-continued

| Arrow | State Transition Conditions (!=NOT; *=OR) Condition (transition if true) |
|---|---|
| 305B | conv*cycle |
| 305C | (mode==PASSIVE)*!pset*!conv*cycle |
| 305D | pset*!conv*cycle |
| 306A | !cycle |
| 306B | !pset*cycle |
| 306C | pset*cycle |
| 308A | !cycle |
| 308B | conv*cycle |
| 308C | !conv*!pset*cycle |
| 308D | !conv*pset*cycle |
| 310A | cycle |
| 310B | !cycle |

1. General Structure and Filter Operation

As shown in FIG. 3, a transmit data line 204 from a DSP is preferably coupled to two separate digital filters in a cancel means or cancel module 208 and an adapt means or adapt/window module 220. Voicefile playback data is provided on the transmit data line source 204. An echo path is formed by passage of data signals on lines 206A and 206B to downstream functions such as a DTMF detector 210, a speech recognition module 211, and a speech decoder 212. Filter coefficient signals 219 and a delay signal 218, can be transferred from the adapt module to the cancel module upon command of adaptation control 230. An adder 216 applies the cancel module signal to the receive data signal to cause cancellation of echo.

Adapting logic 230 provides control of two core functions: the "adapt" function of adapt module 220 and the "cancel" function of cancel module 208.

The adapt function is completely independent of the cancel function. The adapt function is said to run in non-real-time for the following reasons. It operates on buffered transmit and receive data frames that have passed an acceptability test which is based on signal power calculations. Processing of a buffered (transmit & receive) data frame may take more than one elapsed frame, where elapsed frame refers to the regular transmission and reception of frames.

Thus, the echo canceller of FIG. 3 takes as input the transmitted and received data frames and delivers as output an "echo-cancelled" data frame (a "residual" data frame) which represents data received from which the echo has been subtracted. The module then replaces the received frame with the residual data frame for all subsequent signal processing operations carried out by the DSP. Thus, operation of the echo canceller is transparent to any other DSP module; only the post-cancellation buffer data is seen by subsequent DSP modules. The echo canceller preferably is operational on all channels only when transmitted data represents playback of voice data, because during generation of DTMF tones, detection or recognition of received signals is not typically required. Thus, in a voice messaging system, the cancel filter of the echo canceller is preferably active only when the system is playing back a voicefile message stored on one of the hard disk drives or in memory. The adapt module can be continuously active. However, the canceller can be enabled during the generation of tones and other non-voice signals as the system requires.

2. Initialization

At the beginning of a telephone call, an EC_Init module active on the DSP initializes variables in the EC_Var data structure and sets data and filter coefficient buffers to zero. Preferably the filter buffers are in a data structure called struct adapt, and each include 180 digital data points, which represent one frame of data or 22.5 ms of real time speech.

Next control is passed to an EC_Control module, which implements adaptation control 230 using calls to routines named EC_power, EC_adapt, EC_window, EC_filter, EC_align, EC_getResp, and EC_tail.

3. Data Acquisition and Power Criteria Test

Data is required for adaptation before coefficients can be sent to the cancel filter. Adapt/window module 220 operates on buffered transmit and receive frames of data which have passed an acceptability test. In contrast, prior art adaptive filter echo cancellers operate on all transmit and received data. Also, in the invention, the residual data generated does NOT replace the receive data.

States 300 and 306 of FIG. 4 show logic used to initially acquire data to adapt on. The EC_PRE_DATA state 300 is entered after initialization. As indicated by arrow 300A, the adaptation control 230 remains in state 300 until boolean variable pset is true [!pset*cycle*(-mode!=null) and (mode==null)*!hInit].

An EC_power routine is called in EC_PRE_DATA and EC_POST_DATA (states 300 & 306) to perform a power criterion measurement on a frame. Since adaptation during very low levels of transmitted data is counter-productive, adaptation is performed only when the transmitted data power exceeds a predetermined threshold; an EC_power routine performs this test.

The number of frames of valid data for which the EC_power test is performed (before adaptation and cancellation begins) is set to a fixed number determined by a typical empirical convergence rate. When EC_power is called from EC_PRE_DATA, the number of frames is preferably five frames. When EC_power is called from EC_POST_DATA, two frames are preferred. These numbers are configurable. After suitable data is acquired, control, is passed to the adaptation function. If the invention is in the EC_PRE_DATA state, control is passed on arrow 300C to the EC_PRE_ADAPT state 302 when [(mode!=null)*pset] is true. If the EC_POST_DATA state is active, control is passed to the EC_POST_ADAPT state.

Because EC_power requires a power criterion to pass a data frame to the adapt states, it is possible that far more than five frames (or two frames if in POST_DATA) will be examined by EC_power. However, the boolean pset variable will be set true only if a frame meets the power criterion of EC_power.

4. Adaptation and Adaptation Control

As shown in FIG. 4, the adapt function operates in two modes: a "pre-adapt" mode (states 300, 302, and 304 of FIG. 4) and a "post-adapt" mode (states 306, 308, and 310). These modes (and groups of states) differ only in the parameters governing the adapt function. The pre-adapt parameters are typically designed for faster adaptation than the post-adapt parameters. In the pre-adapt mode, the echo canceller sets up an initial adaptation level.

Pre-adaption preferably includes several configurable discrete steps.

A masked white noise "burst" is preferably used to set initial echo levels. At the beginning of a phone call, the burst function generates a burst of low-level white noise, masked by configurable tones (signals), as transmit data. The transmit and receive data are input to the adapt function in the usual way, and pre-adaptation proceeds. The white noise thus acts as a training signal. Use of burst adaptation can be set on or off. Burst adaptation with masking tones allows for a substantially reduced startup time (which is the time before the cancel function becomes operational), since the noise-generation function requires significantly less computational effort than the DSP playback function (since this normally includes speech de-compression). Furthermore, burst adaptation improves echo cancellation performance, since the white noise source is more "frequency rich" than speech; as a result, the adaptation results in a more accurate echo model. The configurable masking tones are selected such that audible impact of the burst is low, and distortion of receive data, by the person at the other end inputting DTMFs or speech, is small. Selecting ring-tones as masking tones is considered best.

To ensure that enough data is processed for accurate pre-adaption, five frames of data must be adapted on in state 302 before control is passed to EC_PRE_WINDOW state 304. A boolean variable converge is set true when five frames are processed by the adapt module. Thus, control is passed on arrow 302A to state 304 when conv is true. If no convergence has occurred and insufficient data is received ([!conv*! pset] is true) then control is passed on arrow 302B to state 300. In contrast, if [!conv*pset] is true then control is passed on arrow 302C to EC_adapt and back to EC_PRE_ADAPT.

State 302 (and pre-adaption) can be skipped completely if a mode variable is set null. Thus, if [(mode==null)*hInit]is true, initialization is done and control is passed on arrow 300D to state 304. This control path is used, for example, when an application program outside EC is reconnecting a port to the DSP and no adaptation is desired.

An adaptation algorithm is implemented in the routine EC_adapt in states 304, 310, using a "sign-sign" least mean squares (LMS) algorithm of generally conventional design. A configurable "step size" parameter helps determine the adaptation rate and the residual error after convergence. However, a six-sample delay occurs at the input of the adapt filter. This accounts for observed hardware-dependent delay between transmit and receive for a station-loop line interface module, and is assumed to be a minimum. This delay is shown as the trip delay 508 in FIG. 5. The delay causes the adapt module not to adapt the first six coefficients.

5. Cancel Function

The cancel function consists of cancel filter 208 which generates an echo estimate, taking the transmit data on line 206B as input, followed by subtraction of the echo-estimate from the receive data using adder 216 to generate the residual data. The residual data replaces the receive data, thus performing the cancellation function. The cancel function operates continuously on all transmit and receive data.

During the beginning of a telephone call, the cancel function does not operate. The cancel function operates concurrently with the POST_ADAPT in that the cancel filter coefficients are periodically derived from the most recent adapt filter coefficients. Thus the coefficients of the cancel filter reflect the ongoing adaptation.

Impulse response ("click") can be used to initialize the cancel filter. Digital impulse recording is used during an actual phone call to obtain an impulse response sample (see Section 7 below). During the phone call, the recorded impulse response samples, properly windowed and aligned, can be used to initialize the finite impulse response (FIR) cancel filter co-efficients. The impulse thus acts as a "training signal" with two main benefits. First, the impulse will minimize the startup delay associated with the pre-adapt mode of adaptation, (during which the cancel function does not operate), since it requires negligible computational effort to perform its function. Second, the impulse has negligible audible impact, being heard as a barely perceptible click. The post-adapt mode of adaptation may function as usual.

Cancel filter 208 of FIG. 3 is implemented in the EC_filter routine, which provides a finite impulse response (FIR) filter to cancel echo out of received data. As indicated by arrow 305A of FIG. 4, the adaptation control 230 remains in state 305 as long as a cycle variable (discussed below) is false, i.e. no DSP processing cycles are available. The cancel filter is implemented with preferably 32 coefficients whereas the adapt filter has preferably 48 coefficients. The cancel filter has fewer coefficients than the adapt filter to enable high resolution adapting without taxing computation, which is highly dependent on the number of coefficients in the cancel filter. The 48 coefficients corresponds to 6.00 ms of real time, which was determined in practice to compensate for echo durations observed in practice.

The selection of 32 of 48 coefficients for transfer to the cancel filter is done in a procedure EC_window, implemented in states EC_PRE_WINDOW and EC_POST_WINDOW, shown as states 304 and 310 in FIG. 4. From the 48 adapt coefficients, a plurality of "windows" of 32 adjacent coefficients are selected, and the total energy of all data points in the window is determined by computing the sum of the squares of the energy level. The window with the maximum energy or maximum sum of squares is selected. No threshold detection is used; rather the best adjacent 32 taps are selected. The EC_window procedure also generates a delay interval signal 219 which is output before the first selected filter coefficient. The selected window is an adjacent set of coefficients, increasing efficiency.

Figure 5:
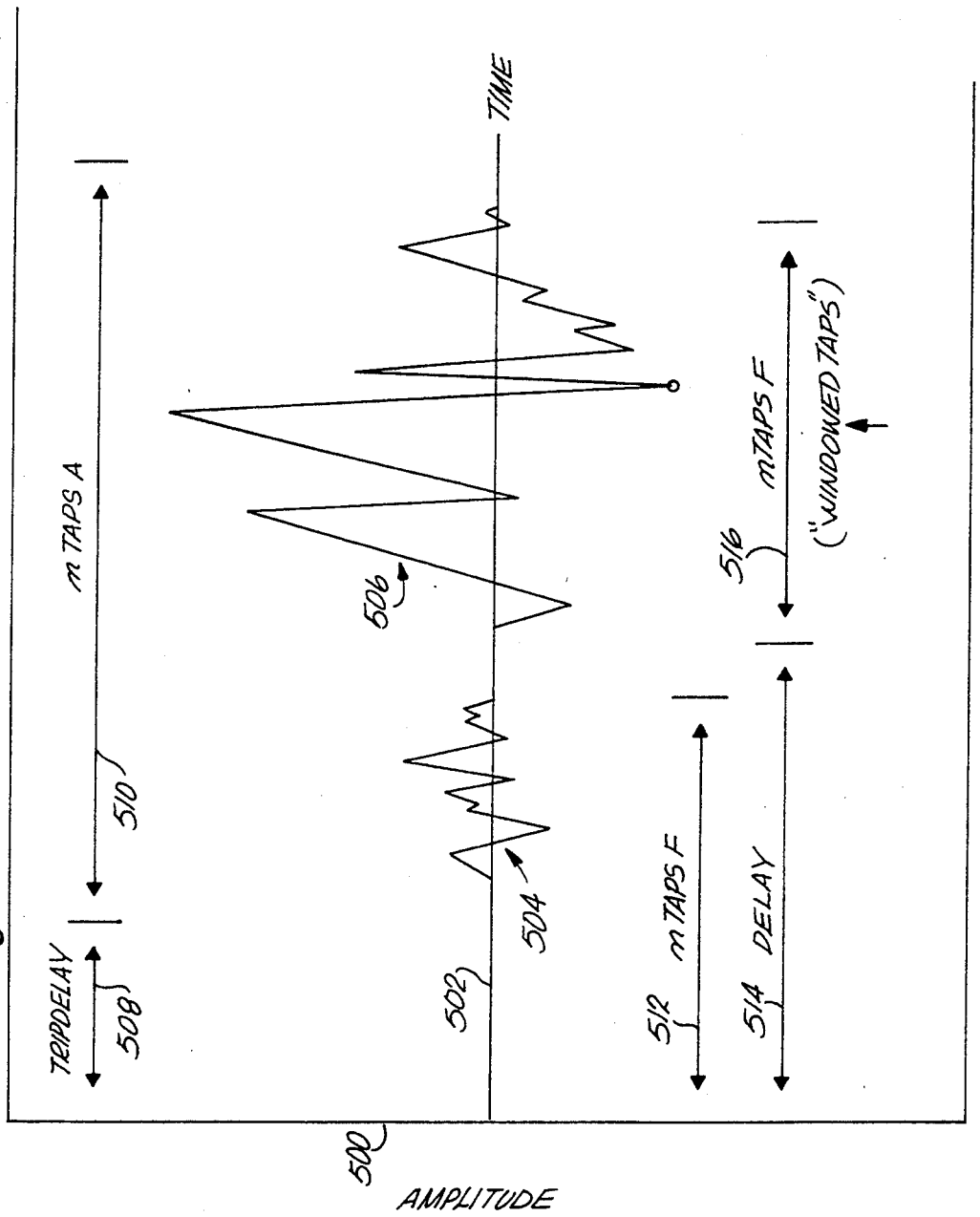
FIG. 5 is a diagram of exemplary echo waveforms showing a windowing feature of the invention.

Windowing can be understood with reference to FIG. 5, which depicts exemplary echo waveforms on two axes 500, 502 representing echo amplitude and time, respectively. A first waveform 504 represents, for example, a far-end echo, and a second waveform 506 represents a near-end echo of much larger magnitude. As one skilled in the art will recognize, waveforms 504, 506 are merely exemplary and actual waveforms could have different profiles. A hardware-dependent trip delay of zero echo amplitude is empirically known to precede the first echo, as shown by arrow 508. The total duration of both waveforms is arbitrary but to conserve computational resources, the system considers a maximum of nTapsA taps, such as 50 taps. A program variable nTapsA defines a first tap count of the number of taps for adaptation; nTapsF is a second tap count defining the number of taps for filtering.

Cancellation of both waveforms 504,506 is desirable. Unfortunately, DSP computational limits are best used by cancellation of only nTapsF taps (arrows 512, 514). Thus, since resources are limited, the second waveform 506 is a more serious echo and cancellation of it is more desirable. The second waveform is a "better window" in which to apply cancellation than the first waveform.

In prior art echo cancellers, an nTapsF cancellation signal would be applied at the start of the waveform as shown by arrow 512. In the present invention of FIG. 3, the adaptation control 230 causes the adapt/window module 220 to generate a delay value 219 represented as arrow 514 of FIG. 5. Then the nTapsF error signal is output in the position of arrow 516. As a result, the second waveform 506 is cancelled, resulting in better performance.

If EC_filter (state 305) is active, and a DSP cycle becomes available when convergence has not occurred (i.e. [!conv*cycle] is true), then control is passed on arrow 305B to EC_POST_WINDOW to cause a window of coefficients to be transferred to the cancel filter. If no cycles are available ([!cycle] is true), control is passed on arrow 310B to state 305 where further adaptation occurs.

In operation, if a DSP cycle is available (cycle is true) then adaptation control remains in EC_PRE_WINDOW or EC_POST_WINDOW as indicated by arrows 304A, 310A. When the best set of adjacent taps is found and the adaptation control is in pre-adapt mode, control is passed to state 305 on arrow 304B, thereby causing the set preConv of selected taps to be transferred to the cancel filter. If post-adapt mode is active, then control is passed on arrow 310B to state 305 and the cancel filter coefficients are also updated.

6. Cycle Steal Feature

To take advantage of extra available DSP cycles, a "cycle steal" feature is implemented. As is known in the art, a DSP can process various types of voice-band activity in a single channel; each activity consumes DSP resources. Each frame corresponds to a finite number of DSP computation cycles, so only a finite number of actions can be taken during each frame. When an activity required for each of the channels being served is complete for a given frame, normally the DSP will idle until the next receive and transmit frames are acquired. In this invention, this idle period is use to carry out adaptation computations required by the echo-canceller. This feature is called a "cycle-steal" function.

To implement the cycle-steal function, a boolean variable "cycle" is provided in the DSP memory store. The adaptation control determines whether real time is available after required processing for all channels is completed for the current frame duration; if so, "cycle" is set true. The EC_control procedure is then called, causing EC_adapt to be called, enabling adaptation to be performed on subsets of the total number of points buffered, as shown in FIG. 4, until available real-time is entirely consumed. Thus, multiple calls to EC_control may be made if sufficient cycles can be "stolen."

To further facilitate processing efficiency, a frame segmentation technique is used. Each frame is divided into an integer number of segments, each containing a predefined number of samples. The cycle steal routine determines whether enough DSP real time is available to process one segment. If so, the segment is adapted on. The segment size and number of segments per frame are defined in the modules of Appendix A.

The cycle variable is tested in nearly all the state transition paths of FIG. 4. Therefore, cycle availability is a predicate for almost all the state transitions. This arrangement allows the updating of the cancel-filter to occur many times per second in a typical voice messaging or voice response environment. Thus, of the data being processed by the DSP, only a percentage proportional to available real-time is utilized for adaptation. Moreover, this percentage is found, even under heavy DSP utilization conditions, to be adequate for the desired level of echo-cancellation performance in the voice system.

7. Configurability of Echo-Canceller Parameters.

Further, the various parameters used in the echo-canceller are configurable, i.e. they may be changed while the signal-processing system (including the echo-canceller) is operational. Configurability of parameters is advantageous because the parameters may be adjusted to compensate for specific echo characteristics and available processing power. As presently embodied, the invention can be reconfigured while the voice messaging system is operational but while the application including the invention is off-line or disabled. The parameter values are changed and the application is reloaded to the DSP.

Configurability of parameters is advantageous in many ways. To implement configurability, all important echo cancellation attributes are represented as software variables or constants, shown in Appendix A, and these parameters may be subsequently changed while the messaging system is operational. The configurable parameters are listed in the DT Module Parameters of Appendix A.

Configurability is desirable to fulfill system site requirements. Due to variations in the types of equipment that are connected to the voice messsaging/response system, certain parameter choices may be more optimal. For instance, in certain digital networks, echo delays are significantly longer than in analog systems. Thus, it may be beneficial to increase the "flat" delay parameter in the adapt-filter to allow the adaptation to model/more of the non-trivial section of echo.

Second, configurability enables adjustment of desired echo suppression performance. The echo cancellation parameters may be adjusted to trade off different performance goals for a given system. A crucial aspect of echo cancellation is that it must always be functional. "Startup time" the delay at the beginning of a call before the cancel-filter becomes operational, may need to be reduced, since during this time the benefits of echo cancellation are not experienced. To reduce the startup time, one may select a shorter duration for the pre-adapt mode of the adapt function (providing an initially lower level of echo performance but providing it sooner).

Configurability also allows the system to be sensitive to real-time restrictions. For example, with the incorporation of new features, each requiring DSP processing time, less or more real-time may be available for echo cancellation. The configurability of the module allows a degradation in echo-canceller performance to be traded off for such new features.

8. Digital Echo Impulse Response Recording

Recording of echo impulse response digitally on the voice messaging/response system for arbitrary telephone connections enables characterization of echoes. This measures the time-domain echo transfer characteristics (and hence the frequency domain characteristics) accurately, and even by inspection, one can use the response to pin-point various sources of echo along the telephone connection, relative magnitude, delays, etc.

E. Conclusions

Thus, the invention provides an echo canceller with many advantages over the prior art. For example, the invention offers increased computational efficiency. Separation of the "adapt" function from the "cancel" function in the echo-canceller enables design of the adapt function to be essentially freed from real-time restrictions. The cancel function operates in real-time, as it must by definition. Also, data buffering results in more computational efficiency. The adapt function operates on buffered frames of transmit and receive data which have passed a power criterion, and utilizes all available real-time after other DSP functions have been completed. Thus, of the data being processed by the DSP, only a percentage proportional to available real-time is utilized for adaptation. Adaptation is also speeded up in this invention by the "cycle-steal" function. Any idle period of the DSP is used to carry out adaptation computations required by the echo canceller. A windowing technique is used for derivation of the cancel filter coefficients. Both the adapt and cancel filters are the finite impulse-response (FIR) type. The coefficients with the largest magnitude produce the largest reduction in echo. Therefore, a rectangular window of maximum length as allowed by real-time is applied to the adapt coefficients. A sum of squares calculation is performed on the windowed coefficients. The window which produces the largest accumulation is chosen as the best set of coefficients to use for the cancel filter. Thus, the cancel filter requires a reduced number of multiply or accumulate operations during filtering. The invention also minimizes startup (convergence) time using the pre-adapt mode.

APPENDIX A

```
/***********************************************************************/
/*
* ======== DT module parameters ========
*
* This new default is based on the default2 specification. The primary
* change is that this is to be used in conjunction with echo cancellation.
* As a result, added precautions have been made to decrease the likelihood
* of talkoff during message and prompt playout by increasing the echo
* factors. The change in prompt mode does NOT preclude the talkoff
* preprocessing of prompts. This increase in echo factors only takes
* affect after pre-adaptation convergence so that echo performance does
* not suffer during this "window of vulnerability".
*
* Additional changes to default and record mode echo factors and thresholds
* were made to conform to the notion of an absolute "noise" floor. This
* floor is -48 dBm for all modes but prompt.
*/
/*
* The following is a TABLE of DTMF parameters. There are six primary
* modes of operation. A description of the modes is as follows:
*
```

| Mode | Name | Description |
|---|---|---|
| 0 | Default | No play nor record in progress; |
| 1 | Record | Record of voice file; |
| 2 | Message(c) | Play of unprocessed voice file after echo cancellation convergence; |
| 3 | Message | Play of unprocessed voice file prior to echo cancellation convergence; |
| 4 | Prompt(c) | Play of processed voice file after echo cancellation convergence; |
| 5 | Prompt | Play of processed voice file prior to echo cancellation convergence; |

```
* Processing of a voice file implies the verification of talkoff
* resistance.
*/
/*
* The DTMF parameters have a number of significant interdependencies.
* Therefore, care must be given when changing any of the parameters.
* The value ranges should be viewed as absolute ranges although no
* parameter checking is performed.
*
* Parameter Key:
```

| | | | | | |
|---|---|---|---|---|---|
| absm: | absolute magnitude | [ | −25.0 .. | −40.0 dBm | ] |
| delta: | interframe absolute magnitude delta | [ , | 6.0 .. | 12.0 dB | ] |
| fdi: | freq deviation index (2.0, 2.5, 3.0%) | [ | 0 .. | 2 | ] |
| h2lt: | high to low twist | [ | 4.0 .. | 12.0 dB | ] |
| l2ht: | low to high twist | [ | 8.0 .. | 16.0 dB | ] |
| cons: | interframe consistency | [ | 1.1 .. | 5.4 dB | ] |
| rfon: | required frames on | ] | 3 .. | 5 | ] |
| rfoff: | required frames off | [ | 3 .. | 5 | ] |
| ethr0: | echo threshold 0 | [ | −25.0 .. | −40.0 dBm | ] |
| efl0: | low echo factor 0 | [ | 0.0 .. | 2.5 dB | ] |
| efh0: | high echo factor 0 | [ | 0.0 .. | 9.0 dB | ] |

APPENDIX A -continued

```
*       efx0:     test echo factor 0        [      0.0 ..      16.0 dB   ]
*       ethr1:    echo threshold 1          [    -25.0 ..     -40.0 dBm  ]
*       efl1:     low echo factor 1         [      0.0 ..       2.5 dB   ]
*       efh1:     high echo factor 1        [      0.0 ..       9.0 dB   ]
*       efx1:     test echo factor 1        [      0.0 ..      16.0 dB   ]
*
* To calculate receiver detection duration requirements, use the following
* formula:
*
*       duration (msec) = rfon * 11.25 (msec) + 5.50 (mSec)
*
* For the typical cases, values of 3, 4, or 5 will be used for rfon. These
* correspond to a receiver input duration requirement of 39.25 mSec, 50.50
* mSec, and 61.75 mSec (respectively).
*/
```

Mode Dependent Parameter Specifications

| Param | Def   | Rec   | Msg(c) | Msg   | Prm(c) | Prm   | Valid Range      |
|-------|-------|-------|--------|-------|--------|-------|------------------|
| absm  | -36.0 | -36.0 | -36.0  | -36.0 | -36.0  | -36.0 | -25.0 .. -40.0 dBm |
| delta | 9.0   | 9.0   | 9.0    | 9.0   | 9.0    | 9.0   | 6.0 .. 12.0 dB   |
| fdi   | 0     | 0     | 0      | 0     | 0      | 0     | 0 .. 2           |
| h21t  | 6.0   | 6.0   | 6.0    | 6.0   | 8.0    | 8.0   | 4.0 .. 12.0 dB   |
| 12ht  | 9.0   | 9.0   | 9.0    | 9.0   | 11.0   | 11.0  | 8.0 .. 16.0 dB   |
| cons  | 3.0   | 3.0   | 3.0    | 3.0   | 3.0    | 3.0   | 1.1 .. 5.4 dB    |
| rfon  | 3     | 3     | 3      | 3     | 3      | 3     | 3 .. 5           |
| rfoff | 3     | 3     | 3      | 3     | 3      | 3     | 3 .. 5           |
| ethr0 | -36.0 | -32.0 | -34.0  | -36.0 | -36.0  | -36.0 | -25.0 .. -40.0 dBm |
| efl0  | 2.5   | 2.5   | 2.5    | 2.5   | 2.5    | 2.5   | 0.0 .. 2.5 dB    |
| efh0  | 9.0   | 9.0   | 9.0    | 9.0   | 6.0    | 3.0   | 0.0 .. 9.0 dB    |
| efx0  | 12.0  | 16.0  | 14.0   | 12.0  | 6.0    | 3.0   | 0.0 .. 16.0 dB   |
| ethr1 | -36.0 | -36.0 | -36.0  | -36.0 | -36.0  | -36.0 | -25.0 .. -40.0 dBm |
| efl1  | 2.5   | 2.5   | 2.5    | 2.5   | 2.5    | 2.5   | 0.0 .. 2.5 dB    |
| efh1  | 9.0   | 9.0   | 9.0    | 9.0   | 6.0    | 3.0   | 0.0 .. 9.0 dB    |
| efx1  | 12.0  | 12.0  | 12.0   | 12.0  | 6.0    | 3.0   | 0.0 .. 16.0 dB   |

```
/*
* ========EC module parameters ========
*
* The following parameters define the state of the echo cancellation
* module. The modes of operation are: null (0), passive (1), and
* burst (2). Due to implementation simplifications, the number of
* taps for adaptation and filtering must be modulo eight (8) within
* the range specified.
*/
#define EC_TRIPDELAY    6                /* trip delay (output to input) [1..130] */
#define EC_NTAPSA       48               /* number of taps for adaptation [32..72] */
#define EC_NTAPSF       32               /* number of taps for filtering [16..72] */
/* The following are for
the initial (pre)
adaptation phase */
#define EC_DEFMODE      1                /* pre-adaptation mode */
#define EC_DEFSNUM      12               /* number of adaptation segments [1..18] */
#define EC_DEFSAVAIL    1                /* number of segments available [1..18] */
#define EC_DEFSTEP      4                /* adaptation step size [1..16] */
#define EC_DEFPMIN      1                /* adaptation power minimum [-1..10] */
#define EC_DEFFMIN      5                /* adaptation frame requirement [1..30] */
/* The following are for
the continuous (post)
adaptation phase */
#define EC_DEFPMODE     1                /* post-adaptation mode */
#define EC_DEFPSNUM     18               /* number of adaptation segments [1..18] */
#define EC_DEFPSAVAIL   1                /* number of segments available [1..18] */
#define EC_DEFPSTEP     1                /* adaptation step size [1..16] */
#define EC_DEFPPMIN     1                /* adaptation power minimum [-1..10] */
#define EC_DEFPFMIN     2                /* adaptation frame requirement [1..30] */
/* The following are for
the burst masking effect */
#define EC_SCALE        1000             /* white noise scale value */
#define EC_HEAD         18               /* head tone duration (frames) */
#define EC_TAIL         18               /* tail tone duration (frames) */
#define EC_EREQ1        440              /* first tone freq */
#define EC_FREQ2        480              /* second tone freq */
#define EC_AMPL1        315              /* first tone ampl */
#define EC_AMPL2        315              /* second tone ampl */
/* Routine declarations */
void EC_init();
void EC_control();
void EC_adapt();
void EC_align();
void EC_filter();
void EC_getResp();
void EC_tail();
```

APPENDIX A

```
void EC_power();
void EC_window();
/* State machine state definitions */
#define EC_PRE_DATA                 0
#define EC_PREADAPT                 1
#define EC_PREWINDOW                2
#define EC_FILTER                   3
#define EC_POST_DATA                4
#define EC_POST_ADAPT               5
#define EC_POST_WINDOW              6
/* Adaptation modes */
#define EC_NULL         0           /* no adaptation */
#define EC_PASSIVE      1           /* passive play adaptation */
#define EC_BURST        2           /* Gaussian noise burst adaptation */
/* General definitions */
#define EC_FRAMESIZE    180         /* frame size */
#define EC_MAXTAPS      72          /* maximum number of taps */
#define EC_FLTSHIFT     12          /* filter shift */
#define EC_RCNTDLY      2           /* initial rCnt 'delay' value */
/*
 * General default configuration values
 *
 * Note, due to implementation details for improved
 * performance, nTapsA must be a multiple of 8.
 */
#define EC_DEFTRPDLY    6           /* codec output to input trip delay */
#define EC_DEFNTAPSA    48          /* number of adaptive taps */
#define EC_DEFNTAPSF    32          /* number of filter taps */
/* Pre-mode passive defaults */
#define EC_DEFMODE      EC_PASSIVE  /* adaptation mode */
#define EC_DEFSNUM      12          /* number of segments per frame */
#define EC_DEFSAVAIL    1           /* segments available */
#define EC_DEFSTEP      4           /* adaptive stepsize */
#define EC_DEFPMIN      1           /* min power for usable frame */
#define EC_DEFFNUM      5           /* frames needed for adapt */
/* Post-mode passive defaults */
#define EC_DEFPMODE     EC_PASSIVE  /* adaptation mode */
#define EC_DEFPSNUM     18          /* number of segments per frame */
#define EC_DEFPSAVAIL   1           /* segments available */
#define EC_DEFPSTEP     1           /* adaptive stepsize */
#define EC_DEFPPMIN     1           /* min power for usable frame */
#define EC_DEFPFNUM     2           /* frames needed for adapt */
/* The following are for the
burst masking effect */
#define EC_SCALE        1000        /* white noise scale value */
#define EC_HEAD         18          /* head tone duration (frames) */
#define EC_TAIL         18          /* tail tone duration (frames) */
#define EC_FREQ1        440         /* first tone freq */
#define EC_FREQ2        480         /* second tone freq */
#define EC_AMPL1        315         /* first tone ampl */
#define EC_AMPL2        315         /* second tone ampl */
/* Finite state
machine structure */
typedef struct {
Bool        cycle;                  /* cycle steal */
Bool        pSet;                   /* power requirement met */
Bool        converge;               /* adaptation convergence */
Bool        hInit;                  /* init h[n] array */
} EC_Fsm;
/* Configurable
parameter structure */
typedef struct {
short       trpDly;                 /* codec output to input trip delay */
short       nTapsA;                 /* number of adapt taps */
short       nTapsF;                 /* number of filter taps */
} EC_Param;
/* Adaptation configurable
parameter structure */
typedef struct {
short       mode;                   /* adaptation mode */
short       sNum;                   /* number of segments required */
short       sAvail;                 /* number of segments available */
short       step;                   /* step size */
short       pMin;                   /* minimum power for usable frame */
short       fNum;                   /* number of frames required */
} EC_AdPrm;
/*
 * Adaptation structure
 *
 * Important note: due to the implementation, the d[] array and pBuf[]
 * array must be aligned as they are really a single implied array with
```

-continued

APPENDIX A

```
* d[] initialized with the last play data buffer.
*/
typedef struct {
short           sCnt;                    /* segments completed within frame */
short           fCnt;                    /* frames completed */
short           h[EC_MAXTAPS];           /* impulse response coefficients */
short           s[EC_MAXTAPS+1];         /* filter sign values */
short           d[EC_MAXTAPS+1];         /* filter delay values */
short           pBuf[EC_FRAMESIZE];      /* play buffer */
short           rBuf[EC_FRAMESIZE];      /* record buffer */
} EC_Adapt;
/* Filter structure */
typedef struct {
short           delay;                   /* echo delay index */
short           h[EC_MAXTAPS];           /* impulse response coefficients */
short           d[EC_MAXTAPS+1];         /* filter delay values */
} EC_Filter;
/* Burst mode
masking structure */
typedef struct {
short           scale;                   /* white noise scale value */
short           head;                    /* head tone duration (frames) */
short           tail;                    /* tail tone duration (frames) */
short           freq1;                   /* first tone freq */
short           freq2;                   /* second tone freq */
short           ampl1;                   /* first tone ampl */
short           ampl2;                   /* second tone ampl */
} EC_Mask;
/* General EC_structure */
typedef struct {
EC_Fsm          *fsm;                    /* finite state machine structure */
EC_Param        *prm;                    /* general config structure */
EC_AdPrm        *pre;                    /* pre-adaptation config structure */
EC_AdPrm        *post;                   /* post-adaptation config structure */
EC_Adapt        *ad;                     /* adaptation structure */
EC_Filter       *fi;                     /* filter structure */
EC_Mask         *mask;                   /* burst mask config structure */
short           state;                   /* fsm current state */
short           last;                    /* fsm last state */
Bool            preConv;                 /* pre convergence flag */
short           *pPtr;                   /* current play buffer pointer */
short           *rPtr;                   /* current record buffer pointer */
short           *ePtr;                   /* current residual buffer pointer */
short           lastBufFilled;           /* last buffer filled */
short           sBuf0[EC_FRAMESIZE];     /* play save buffer 0 */
short           sBuf1[EC_FRAMESIZE];     /* play save buffer 1 */
Bool            init;                    /* initialization flag */
Bool            config;                  /* config parameters changed */
short           *xmt;                    /* PCM transmit pointer */
short           *rcv;                    /* PCM receive pointer */
short           rCnt;                    /* impulse response frame count */
} EC_Var;
#endif /* ifndef EC_ */
```

The invention may be practiced in many ways other than as specifically described herein. For example, different quantities of taps can be used in the windowing functions. Thus, the invention should be given the full scope of the appended claims, in which:

What is claimed is:

1. A method of adaptive echo cancellation in a voice messaging or voice response system having a memory store, at least one digital signal processor, a digital voice data receive data line, a transmit data line, and an echo canceller apparatus comprising a digital adapt filter having a plurality of adapt filter coefficients, a digital cancel filter coupled to the adapt filter and an adaptation control means for controlling transfer of the adapt filter coefficients to the cancel filter, the method comprising the steps of:
  identifying a successive quantity of voice data frames on the transmit data line which pass a power criterion and storing the frames in a buffer;
  truncating a plurality of segments from each data frame, and for each segment, deriving adapt filter coefficients from a plurality of taps in each segment during all available computing cycles of the digital signal processor;
  selecting successive adjacent windows of taps from the adapt filter coefficents and identifying by an energy level test the best window; and
  transferring adapt filter coefficients in the best window to the cancel filter.

2. The method of claim 1, wherein the cancel filter is arranged to cause echo cancellation on an input signal on the receive data line in real-time and wherein the adapt filter is operative on buffered data frames.

3. The method of claim 1, wherein the truncating step further comprises the step of testing whether processing cycles of the digital signal processor are available for use, and if so, for setting a boolean variable and for causing the adapt filter to perform further echo cancellation functions responsive to the value of the boolean variable.

4. A method as defined in claim 1 further comprising the initial steps of:

transmitting a burst of white noise on the transmit data line;

combining a tone signal with the burst; and sensing the burst and defining preliminary adapt filter coefficients in response thereto.

5. A method for providing echo cancellation signals in a voice messaging or voice response system having a memory store and a mass storage device and at least one digital signal processor providing a receive data line and a transmit data line and being coupled to the memory store and the mass storage device, the method comprising the steps of:

coupling an adapt filter to the receive data line and to the transmit data line and to the digital signal processor;

coupling a cancel filter to the adapt filter;

identifying a successive plurality of data frames on the receive data line meeting a power criteria test;

storing the successive plurality of data frames in a convergence buffer in the memory store;

deriving a plurality of adapt filter coefficients from the successive plurality of data frames;

selecting successive windowed quantities of taps from each of the adapt filter coefficients;

identifying a best windowed quantity having the most signal energy of successive windowed quantities;

generating a delay value signal using the plurality of adapt filter coefficients;

transferring the delay value and a subset of the adapt filter coefficients corresponding to the best windowed quantity to the cancel filter; and generating a cancel echo signal proportional to a plurality of cancel filter coefficients.

6. A method as defined in claim 5 wherein the step of generating a cancel echo signal is accomplished in real time and wherein the step of deriving the adapt filter coefficients from the successive plurality of data frames further comprises the step of operating on a plurality of segments truncated from each of the data frames in non-real time during playback of a voicefile message.

7. A method as defined in claim 5 further comprising the steps of:

testing whether processing cycles of the digital signal processor are available for use;

setting a value of a boolean variable if cycles are available; and causing further echo cancellation functions to be performed responsive to the value of the boolean variable.

8. A method as defined in claim 5 wherein the step of identifying a best windowed quantity comprises the steps of:

storing each selected successive windowed quantity of taps from the adapt coefficients;

computing a sum of squares of each adapt coefficient of the taps in each selected successive windowed quantity; and comparing the sums of the squares to determine a best windowed quantity.

9. A method as defined in claim 5 further comprising the initial steps of:

transmitting a burst of white noise on the transmit data line;

combining a tone signal with the burst; and sensing the burst to derive initial adapt filter coefficients.

10. A method as defined in claim 9 further comprising the preliminary steps of:

defining a trip delay value for a delay from an output of the transmit data line to an input of the receive data line for a station loop line interface module;

defining a first tap count for a number of taps for adaptation; and defining a second tap count for a number of taps for the subset for filtering.

11. A method for providing echo cancellation signals in a hybrid in a voice messaging or voice response system having a memory store, a mass storage device and at least one digital signal processor providing a receive data line and a transmit data line and being coupled to the memory store and the mass storage device, the method comprising the steps of:

coupling an adaptive finite impulse response filter to the receive data line and to the transmit data line and to the digital signal processor;

identifying a successive plurality of data frames on the transmit data line meeting a power criteria test;

storing the data frames in a buffer in the memory store;

deriving a plurality of adapt filter coefficients from the successive plurality of data frames;

selecting successive windowed quantities of taps from each of the adapt filter coefficients;

identifying a best windowed quantity having the most signal energy of the selected successive windowed quantities;

adjusting the adapt filter coefficients in response to differences between an output of the adaptive finite impulse response filter and a real echo signal on the receive data line;

generating a delay value;

transferring the delay value and a subset of the adapt filter coefficients corresponding to the best windowed quantity to a cancel filter;

generating a cancel echo signal proportional to cancel filter coefficients in the memory store; and mixing the cancel echo signal with the real echo signal.

12. A method as defined in claim 11 wherein the step of generating a cancel echo signal causes echo cancellation on an input signal on the receive line in real time and wherein the step of storing the data frames is preceded by the steps of:

truncating each of a successive plurality of data frames into a plurality of frame segments;

testing whether processing cycles of the digital signal processor are available for use and, if so, setting a value for a boolean variable; and causing further echo cancellation functions to be performed responsive to the value of the boolean variable.

13. A method as defined in claim 11 wherein the step of storing the data frames is preceded by testing whether processing cycles of the digital signal processor are available for use and, if so, setting a boolean variable and causing further echo cancellation functions responsive to the value of the boolean variable.

14. A method as defined in claim 11 further comprising the initial steps of:

transmitting a burst of white noise on the transmit data line;

combining a tone signal with the burst; and sensing the burst and deriving initial adapt filter coefficients.

15. A method as defined in claim 14 further comprising the steps of:

defining a trip delay value for a delay from an output of the transmit data line to an input of the receive data line for a station loop line interface module;

defining a first tap count for a number of taps for adaptation; and defining a second tap count for the number of taps for the subset for filtering.

* * * * *

UNITED STATES PATENT AND TRADEMARK OFFICE
CERTIFICATE OF CORRECTION

PATENT NO. : 5,400,394
DATED : March 21, 1995
INVENTOR(S) : Vijay R. Raman; Mark R. Cromack It is certified that error appears in the above-indentified patent and that said Letters Patent is hereby corrected as shown below:

Column 2, line 32, change "D Messerschmitt" to
-- D. Messershmitt --.
Column 2, line 42, change "D Duttweiler" to
-- D. Duttweiler --.
Column 2, line 46, change "J Cioffi" to -- J. Cioffi --.
Column 2, line 48, change "IEEE" to -- 38 IEEE --.

Column 5, line 36, change "Khz" to -- kHz --.

Column 6, line 58, change "I = NOT" to -- ! = NOT --.

Column 7, line 4, change "I = NOT" to -- ! = NOT --.
Column 7, line 24, after "line" delete "source".

Column 9, line 27, after "adapted" delete "on".

Column 10, line 34, change "corresponds" to
-- correspond --.

Columns 13,14, line 30, in Appendix A change "affect" to
-- effect --.
Columns 13,14, line 64, in Appendix A, under "Parameter
Key" change the bracket "]" to -- [ --.

UNITED STATES PATENT AND TRADEMARK OFFICE
CERTIFICATE OF CORRECTION

PATENT NO. : 5,400,394

DATED : March 21, 1995

INVENTOR(S) : Vijay R. Raman; Mark R. Cromack

It is certified that error appears in the above-indentified patent and that said Letters Patent is hereby corrected as shown below:

Column 17, lines 6-12, move the numbers 0-6 the left to line up with the numbers in column 2.

Signed and Sealed this

Seventh Day of November, 1995

Attest:

BRUCE LEHMAN

Attesting Officer     Commissioner of Patents and Trademarks